Oct. 29, 1935.  F. E. KEY  2,018,726
TUBE CONNECTING DEVICE
Filed Nov. 27, 1931  2 Sheets-Sheet 1
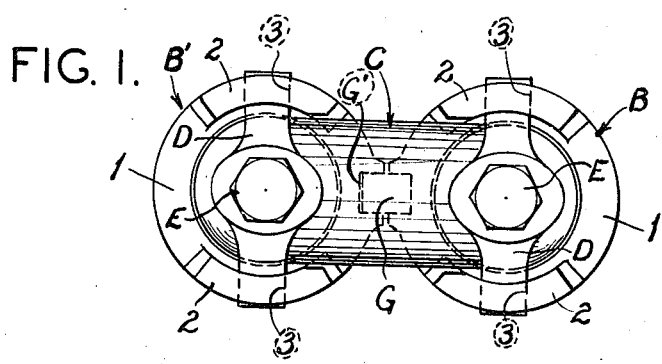
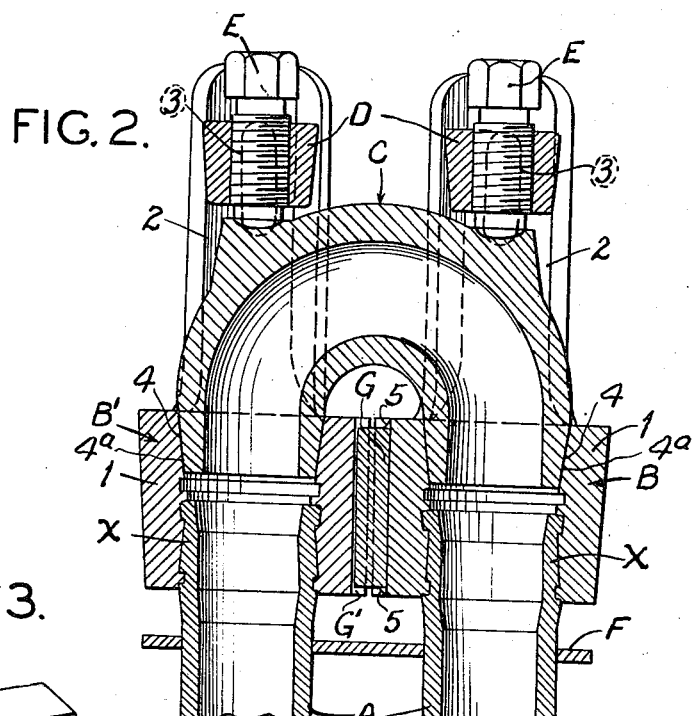
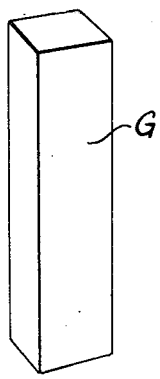
INVENTOR:
FREDERICK E. KEY.
BY Bakewell & Church
ATTORNEYS Oct. 29, 1935.  F. E. KEY  2,018,726
TUBE CONNECTING DEVICE
Filed Nov. 27, 1931  2 Sheets-Sheet 2
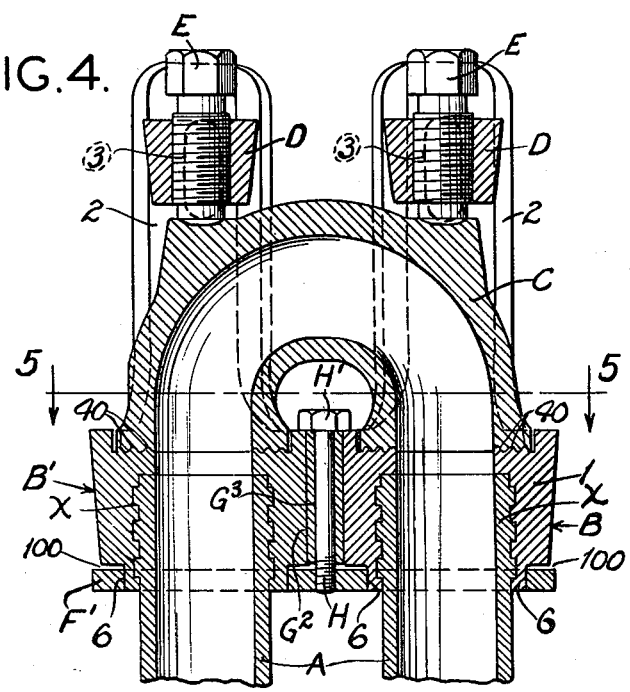
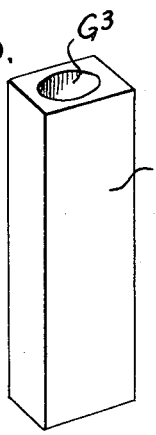
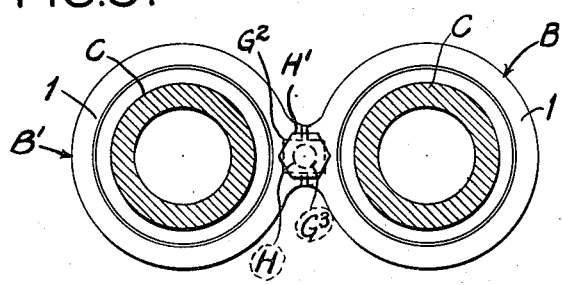
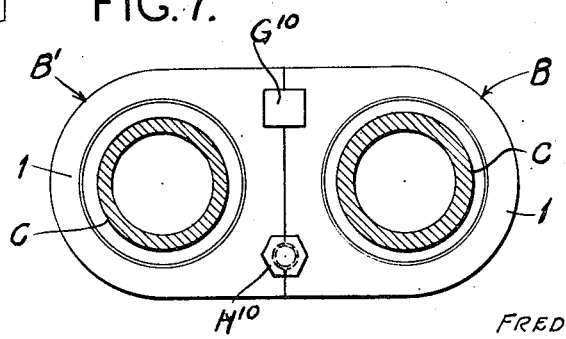
INVENTOR.
FREDERICK E. KEY.
By Bakewell & Church
ATTORNEYS.

Patented Oct. 29, 1935

2,018,726

UNITED STATES PATENT OFFICE 2,018,726

TUBE CONNECTING DEVICE

Frederick E. Key, St. Louis, Mo., assignor to Key Boiler Equipment Company, East St. Louis, Ill., a corporation of Missouri Application November 27, 1931, Serial No. 577,529

9 Claims. (Cl. 285—20)

This invention relates to tube connecting devices of the type that are used extensively in oil cracking stills and other tubular structures for joining two tubes, and particularly, tube connecting devices of the type that comprise a removable tubular element for establishing communication between the tubes, a housing mounted on the tubes, and a retaining means for said tubular element carried by the housing.

One object of my present invention is to provide a tube connecting device of the general type mentioned, whose housing is composed of two main parts or shackles that are combined in a novel manner which permits one shackle to have sufficient endwise movement or longitudinal movement relatively to the other in the operation of tightening the binding screws, to eliminate injurious strains on the tubular element and to insure tight joints between the co-acting parts of the structure, even though there are slight inequalities in the position, size or machining of the co-acting, opposed surfaces of the structure.

Another object is to provide a tube connecting device of the type mentioned, in which the tubes are prevented from spreading or separating laterally, by a means of novel construction that permits a defective tube to be removed quickly and easily without the necessity of drawing the tube endwise through a part of the connecting device that snugly surrounds the tube. Other objects and desirable features of my invention will be hereinafter pointed out.

Fig. 1 of the drawings is a top plan view of a tube connecting device constructed in accordance with my present invention.

Fig. 2 is a vertical longitudinal sectional view of the device shown in Fig. 1.

Fig. 3 is a perspective view of the key that is combined with the shackles to take up torsional strains and prevent the shackles from twisting relatively to each other.

Fig. 4 is a vertical sectional view, illustrating another form of my invention.

Fig. 5 is a horizontal sectional view, taken on the line 5—5 of Fig. 4, looking in the direction indicated by the arrows.

Fig. 6 is a perspective view of the key used in the structure shown in Fig. 4; and Fig. 7 is a horizontal sectional view similar to Fig. 5, illustrating the retaining bolt for the tie bar arranged in a different manner.

I have herein illustrated my invention embodied in a tube connecting device in which the tubes are expanded or rolled into the housing, and the removable tubular element that establishes communication between the tubes has its ends arranged in engagement with seats on the housing, but I wish it to be understood that my present invention is also applicable to devices that are used for connecting or joining tubes provided with upset flanged ends.

In Figs. 1, 2 and 3 of the drawings A designates two tubes arranged in parallel relationship and having their ends $x$ expanded or rolled into two shackles or housing members B and B', each of which comprises an annular portion 1 that surrounds one of the tubes A and also receives one end portion of a removable tubular element C that establishes communication between the tubes. The tube surrounding portion 1 of each shackle is provided with a pair of integral extensions or side arms 2 arranged in opposed relation and provided with elongated slots 3 in which is positioned a member D that carries a binding screw E which acts upon the tubular element C. When the binding screws E associated with the two shackles are tightened the tubular element C will be forced inwardly towards the tubes, and tapered end portions 4 on said tubular element C will be pressed into tight engagement with tapered seats $4^a$ in the tube surrounding portions of the shackles. In order to prevent the tubes A from spreading when the tubular element C is removed to facilitate cleaning the interior of the tubes, the tubes A are arranged in holes in a transversely-disposed tie member F that is positioned between the shackles and the tube sheet (not shown) of the structure from which the end portions of the tubes A project.

As previously stated, the shackles B and B' are combined in such a way that one shackle is capable of sufficient endwise movement or longitudinal movement relatively to the other shackle, in the operation of tightening the binding screws E, to eliminate injurious strains on the tubular element C and to insure tight joints between said element and the shackles, even though there are slight inequalities in the position, size or machining of the co-acting, opposed surfaces of the structure. In the form of my invention shown in Fig. 2 the tube surrounding portion 1 of one shackle, for example, the shackle B, is provided with a key G that is positioned in an open-ended groove G' in the tube surrounding portion of the other shackle, whereby twisting or torsional movement of the shackles is effectively taken up without, however, interfering with the relative longitudinal or endwise movement of the shackles. In the form of my invention shown in Fig. 2 the key G is formed by a separate part or piece that is positioned in a groove in the tube surrounding portion of the shackle B, and then secured in position in any suitable way, as, for example, by welded joints, designated by the reference character 5 in Fig. 2. A tube connecting device of the construction above described is inexpensive to construct, it is easy to install or combine with the tubes and it is of such design that slight inequalities in the co-operating parts of the structure are compensated for and absolutely tight joints are assured without liability of the tubular element C being subjected to injurious strains during the operation of tightening the binding screws E.

In Fig. 4 I have illustrated another form of my invention, wherein a removable, transversely-disposed tie member F' is mounted on reduced end portions 6 of the two shackles or main parts B and B' of the housing, instead of being mounted directly upon the tubes, as in the form of my invention shown in Fig. 2, the reduced portions 6 on the shackles being of cylindrical form and fitting snugly in holes of corresponding shape formed in the tie member F'. A key $G^2$ is arranged in co-acting grooves in the tube surrounding portions 1 of the shackles, so as to take up torsional strains and prevent the shackles from twisting, and means is provided for holding the tie member F' in assembled relationship with the shackles in such a way as to not interfere with the relative longitudinal or endwise movement of the shackles. In the tube connecting device shown in Fig. 4 the tie member F' is retained in operative position by means of a bolt H that extends through a hole $G^3$ in the key $G^2$, the lower end of said bolt being threaded into the tie member F' and the head H' of said bolt being large enough so that it will lap over surfaces at the outer ends of the tube surrounding portions of the shackles. The bolt H is made of such length or is adjusted in the tie member F' in such a way that when the head H' of said bolt bears against the front ends or outer faces of the shackles, there will be a slight space 100 between the tie member F' and the inner faces or inner ends of the shackles, that will permit sufficient endwise or longitudinal movement of one shackle relatively to the other, during the operation of tightening the binding screws E, to compensate for inequalities of the kind previously referred to. One very desirable feature of a tube connecting device of the kind shown in Fig. 4 is that a defective tube can be removed from the structure of which it forms a part without the necessity of drawing the tube endwise through a member of the connecting device that closely surrounds said tube. This, of course, is due to the fact that the tie member F' is mounted on reduced end portions of the shackles, instead of being mounted directly upon tubes. If removal of one of the tubes A becomes necessary, said tube is cut away from the shackle to which it is attached and the bolt H is backed off or loosened so as to permit the tie member F' to be slipped off the reduced portions 6 of the shackles. Thereafter, the cut tube can easily be drawn endwise through the tie member F', owing to the fact that the hole in the tie member through which the cut tube is drawn is of considerably greater diameter than the external diameter of the tube. In the operation of cleaning the tubes, when the tubular element C is removed, the tie member F' which at such times is mounted upon the reduced portions 6 of the shackles, effectively prevents the shackles and the tubes from spreading and the key $G^2$ prevents the shackles from twisting.

In a tube connecting device of the general design shown in Fig. 4 it is not essential that the retaining bolt H for the tie member F' be positioned in the key $G^2$. If desired, said retaining bolt may be arranged in co-acting grooves or slots formed in the meeting sides of the tube surrounding portions, as illustrated in Fig. 7, wherein the reference character $G^{10}$ designates a key arranged at one side of the transverse axis of the shackles, that is relied upon to take up torsional strains and prevent twisting, and the reference character $H^{10}$ designates a retaining bolt arranged at the opposite side of the transverse axis of the shackles in co-acting grooves or slots in the meeting sides of same and having a threaded end portion that is screwed into a tie member similar to the tie member F', previously referred to, that is mounted on reduced inner end portions of the shackles.

In the form of my invention shown in Fig. 4 the tubular element C has end faces made up of a plurality of concentrically arranged rings 40 that are adapted to seat in grooves of corresponding shape formed in the tube surrounding portions 1 of the shackles. Obviously, various other types or kinds of co-acting surfaces on the shackles and on the tubular element C may be used without departing from the spirit of my invention, and as previously stated, those features of my present invention which relate to the means used to prevent twisting of the shackles, and the removable tie member mounted on reduced portions of the shackles, are applicable to devices that are used for joining or connecting flanged or upset tubes.

Having thus described my invention, what I claim as new and desire to secure by Letters Patent is:

1. A tube connecting device, comprising a removable tubular element for establishing communication between two tubes, a housing mounted on the tubes and composed of two main parts or shackles that are capable of a slight endwise or longitudinal movement relatively to each other, a retaining means for the tubular element carried by the shackles, a key positioned in co-acting grooves or slots in opposed portions of the shackles for taking up torsional strains and preventing the shackles from twisting, and means for preventing the tubes and shackles from spreading.

2. A tube connecting device, comprising a removable tubular element that establishes communication between two tubes, a housing composed of two main parts or shackles, capable of slight endwise or longitudinal movement relatively to each other and provided with portions that surround the tubes, a retaining means for the tubular-element carried by said shackles, and a tie member for preventing spreading of the shackles, removably mounted on the shackles.

3. A tube connecting device, comprising a removable tubular element that establishes communication between two tubes, a housing composed of two main parts or shackles, capable of slight endwise or longitudinal movement relatively to each other and provided with portions that surround the tubes, a retaining means for the tubular element carried by said shackles, a tie member for preventing spreading of the shackles, removably mounted on the shackles, and means for holding said removable tie member in assembled relationship with the shackles.

4. A tube connecting device, comprising a removable tubular element for establishing communication between two tubes, a housing made up of two main parts or shackles, capable of a slight relative longitudinal movement or endwise movement and provided with portions that surround the tubes, a retaining means for said tubular element carried by the shackles, means for taking up torsional strains and preventing relative twisting of the shackles, and a tie member for preventing spreading of the shackles, removably mounted on the shackles.

5. A tube connecting device, comprising a removable tubular element for establishing communication between two tubes, a housing made up of two main parts or shackles, capable of a slight relative longitudinal movement or endwise movement and provided with portions that surround the tubes, a retaining means for said tubular element carried by the shackles, means for taking up torsional strains and preventing relative twisting of the shackles, a tie member for preventing spreading of the shackles, removably mounted on the shackles, and means for holding said tie member in assembled relationship with the shackles without interfering with the relative endwise movement of the shackles.

6. A tube connecting device, comprising a removable tubular element for establishing communication between two tubes, a housing composed of two main parts or shackles combined so as to be capable of having a slight endwise movement or longitudinal movement relatively to each other, a retaining means for the tubular element carried by the shackles, a key for taking up torsional strains and preventing relative twisting of the shackles, and a tie member, removably mounted on reduced portions of the shackles.

7. A tube connecting device, comprising a removable tubular element for establishing communication between two tubes, shackles having portions that surround the tubes, means carried by said shackles for retaining the tubular element in operative position, a key between the shackles for taking up torsional strains, a tie member arranged transversely of the tubes and removably mounted on reduced portions of the shackles, and a retaining bolt for said tie member mounted in said key.

8. A tube connecting device comprising a removable tubular element that establishes communication between two tubes, a housing composed of two shackles capable of slight longitudinal movement relatively to each other and provided with portions that surround the tubes, retaining devices for the tubular element carried by said shackles, a key engaging said tube surrounding portions of said shackles preventing twisting of the shackles, a tie member for preventing spreading of the tubes, and means for holding said tie member adjacent to said shackles.

9. A tube connecting device comprising a removable tubular element that establishes communication between two tubes, a housing composed of two shackles capable of slight longitudinal movement relatively to each other and provided with portions that surround the tubes, retaining devices for the tubular element carried by said shackles, a key engaging said tube surrounding portions of said shackles preventing twisting of the shackles, a tie member for preventing spreading of the tubes, and an element attached to said tie member and extending through said key and holding said tie member in cooperative relationship with said shackles.

FREDERICK E. KEY.